United States Patent
Kim et al.

(10) Patent No.: US 10,251,085 B2
(45) Date of Patent: Apr. 2, 2019

(54) METHOD AND DEVICE FOR TRANSMITTING FRAME INCLUDING ERROR CHECK BITS FOR HEADER IN WIRELESS LAN

(71) Applicant: LG ELECTRONICS INC., Seoul (KR)

(72) Inventors: Suhwook Kim, Seoul (KR); Kiseon Ryu, Seoul (KR); Jinyoung Chun, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/534,154

(22) PCT Filed: Aug. 7, 2015

(86) PCT No.: PCT/KR2015/008270
§ 371 (c)(1),
(2) Date: Jun. 8, 2017

(87) PCT Pub. No.: WO2016/111435
PCT Pub. Date: Jul. 14, 2016

(65) Prior Publication Data
US 2017/0353887 A1    Dec. 7, 2017

Related U.S. Application Data

(60) Provisional application No. 62/101,320, filed on Jan. 8, 2015.

(51) Int. Cl.
*H04W 28/04* (2009.01)
*H04W 28/06* (2009.01)
(Continued)

(52) U.S. Cl.
CPC .......... *H04W 28/04* (2013.01); *H04L 1/0041* (2013.01); *H04L 1/0072* (2013.01); *H04W 28/06* (2013.01); *H04L 69/04* (2013.01); *H04L 69/22* (2013.01)

(58) Field of Classification Search
None
See application file for complete search history.

(56) References Cited

U.S. PATENT DOCUMENTS

2007/0104162 A1    5/2007  Kneckt et al.
2010/0014463 A1*   1/2010  Nagai .................. H04B 7/0695
                                                              370/328
(Continued)

FOREIGN PATENT DOCUMENTS

WO    WO 2011/115431 A2    9/2011
WO    WO 2012/159082 A2    11/2012
WO    WO 2013/032124 A1    3/2013

*Primary Examiner* — Chi H Pham
*Assistant Examiner* — Raul Rivas
(74) *Attorney, Agent, or Firm* — Birch, Stewart, Kolasch & Birch, LLP

(57) ABSTRACT

A method and device for transmitting a frame including error check bits for a header in a wireless LAN are disclosed. The method for transmitting a frame in a wireless LAN can comprise the steps of: generating, by an STA, a frame to be transmitted to an AP; and transmitting, by the STA, the frame to the AP, wherein the frame is an A-MPDU, the A-MPDU includes an A-MPDU header subframe and an A-MPDU subframe, the A-MPDU header subframe includes a first MPDU, the A-MPDU subframe includes a second MPDU, the first MPDU, as an MPDU, includes a first MAC header, expect for a MAC body, and the second MPDU, as an MPDU, can include the MAC body and a second MAC header.

4 Claims, 13 Drawing Sheets

(a) Transmitting end (b) Receiving end

(51) Int. Cl.
*H04L 1/00* (2006.01)
*H04L 29/06* (2006.01)

(56) References Cited

U.S. PATENT DOCUMENTS

2011/0080887 A1    4/2011  Krishnaswamy et al.
2014/0233483 A1*   8/2014  You .................... H03M 13/353
                                                       370/329

\* cited by examiner

FIG. 1
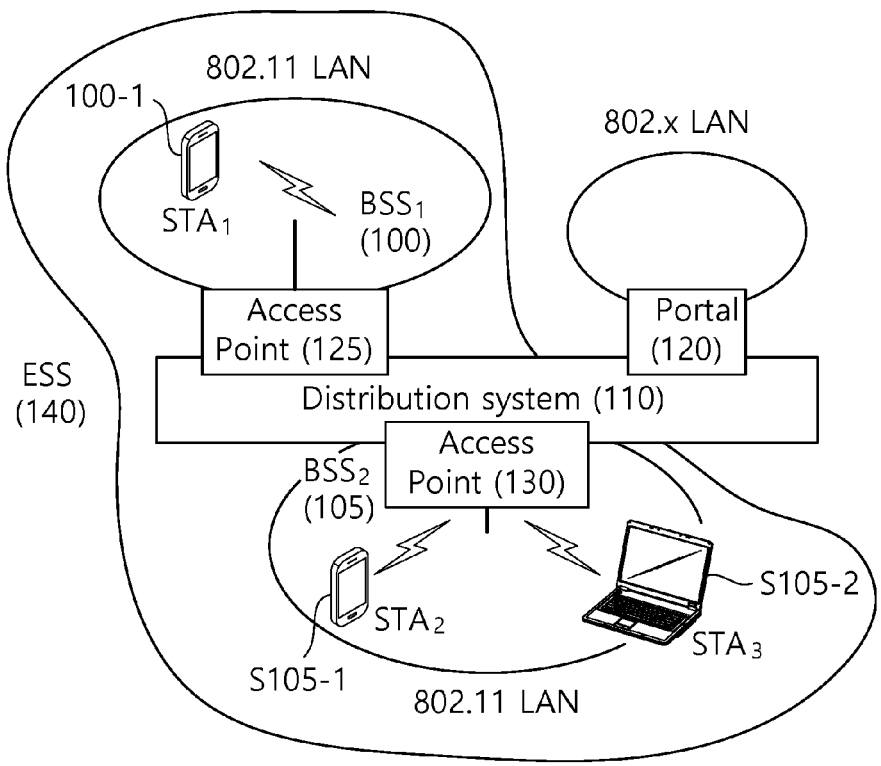
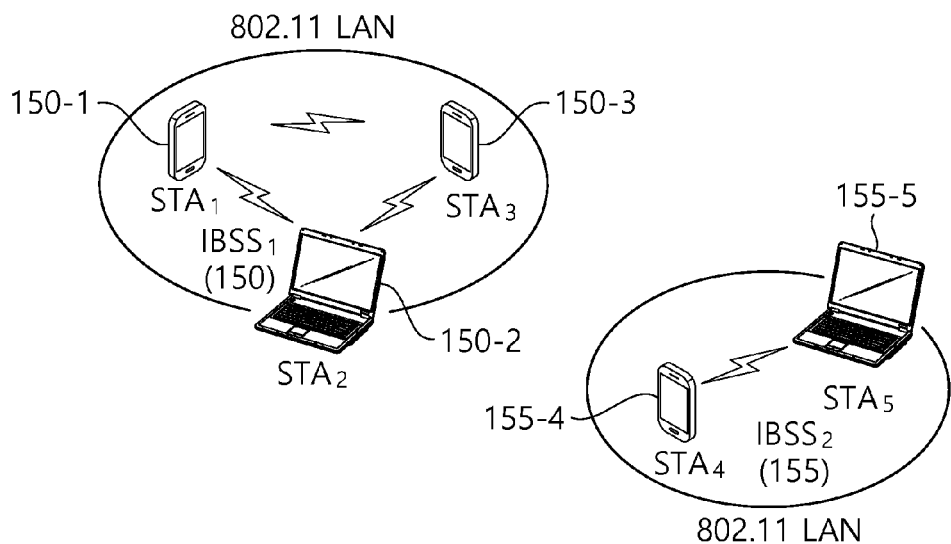

FIG. 4
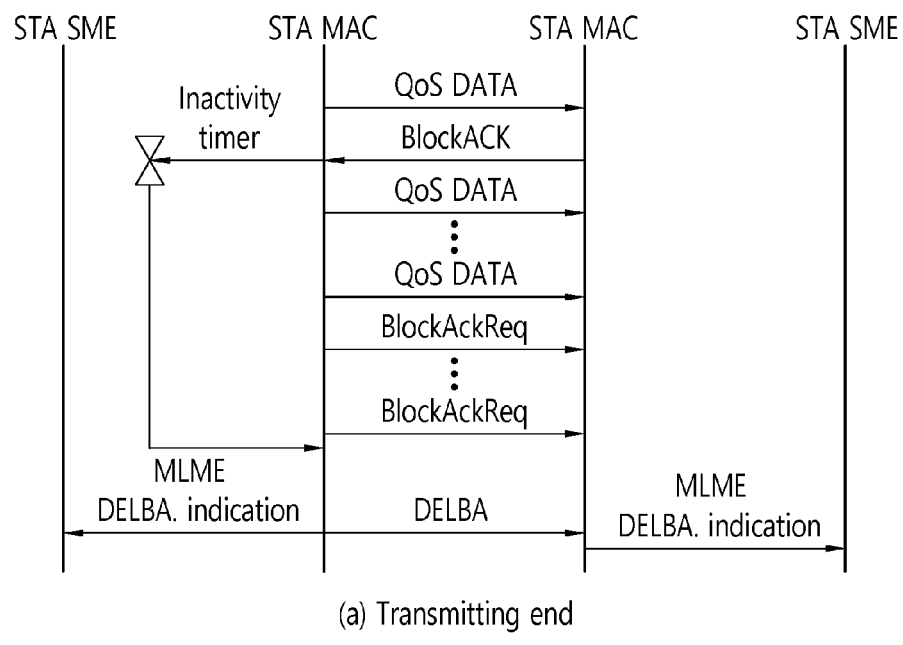
(a) Transmitting end
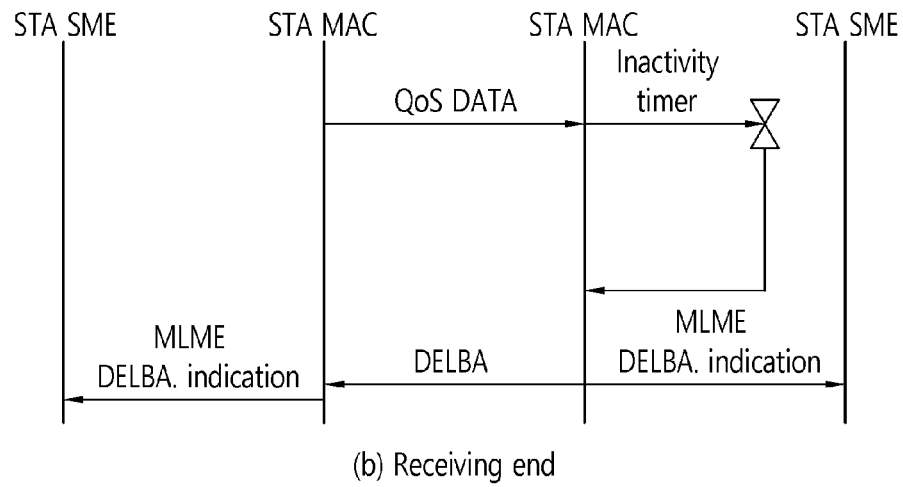
(b) Receiving end

METHOD AND DEVICE FOR TRANSMITTING FRAME INCLUDING ERROR CHECK BITS FOR HEADER IN WIRELESS LAN

CROSS REFERENCE TO RELATED APPLICATIONS

This application is the National Phase of PCT International Application No. PCT/KR2015/008270, filed on Aug. 7, 2015, which claims priority under 35 U.S.C. 119(e) to U.S. Provisional Application No. 62/101,320, filed on Jan. 8, 2015, all of which are hereby expressly incorporated by reference into the present application.

BACKGROUND OF THE INVENTION

Field of the Invention

The present invention relates to wireless communication and, most particularly, to a method and device for transmitting a frame including error check bits for a header in a wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An object of the present invention is to provide a method for transmitting a frame including error check bits for a header in a wireless LAN.

Another object of the present invention is to provide a device for transmitting a frame including error check bits for a header in a wireless LAN.

Technical Solutions

In order to achieve the above-described technical object of the present invention, according to an aspect of the present invention, a method for transmitting a frame in a wireless LAN may include the steps of generating, by a station (STA), a frame that is to be transmitted to an access point (AP), and transmitting, by the station (STA), the frame to the AP, wherein the frame may correspond to an aggregated (A)-medium access control (MAC) protocol data unit (MPDU), wherein the A-MPDU may include an A-MPDU header subframe and A-MPDU subframes, wherein the A-MPDU header subframe may include a first MPDU, wherein the A-MPDU subframe may include a second MPDU, wherein, as a MPDU, the first MPDU may include a first MAC header excluding a MAC body, and wherein, as a MPDU, the second MPDU may include a MAC body and a second MAC header.

In order to achieve the above-described technical object of the present invention, according to another aspect of the present invention, a station (STA) for transmitting a frame in a wireless LAN may include a radio frequency (RF) unit transmitting or receiving radio signals, and a processor being operatively connected to the RF unit, wherein the processor may be configured to generate a frame that is to be transmitted to an access point (AP), and to transmit the frame to the AP, wherein the frame may correspond to an aggregated (A)-medium access control (MAC) protocol data unit (MPDU), wherein the A-MPDU may include an A-MPDU header subframe and A-MPDU subframes, wherein the A-MPDU header subframe may include a first MPDU, wherein the A-MPDU subframe may include a second MPDU, wherein, as a MPDU, the first MPDU may include a first MAC header excluding a MAC body, and wherein, as a MPDU, the second MPDU may include a MAC body and a second MAC header.

Effects of the Invention

By checking an error occurring in a medium access control (MAC) header and by reducing overhead of the MAC header, wireless LAN efficiency may be enhanced.

BRIEF DESCRIPTION OF THE DRAWINGS

FIG. 1 is a conceptual view illustrating the structure of a wireless local area network (WLAN).

FIG. 4 illustrates a block ACK operation.

DESCRIPTION OF EXEMPLARY EMBODIMENTS

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
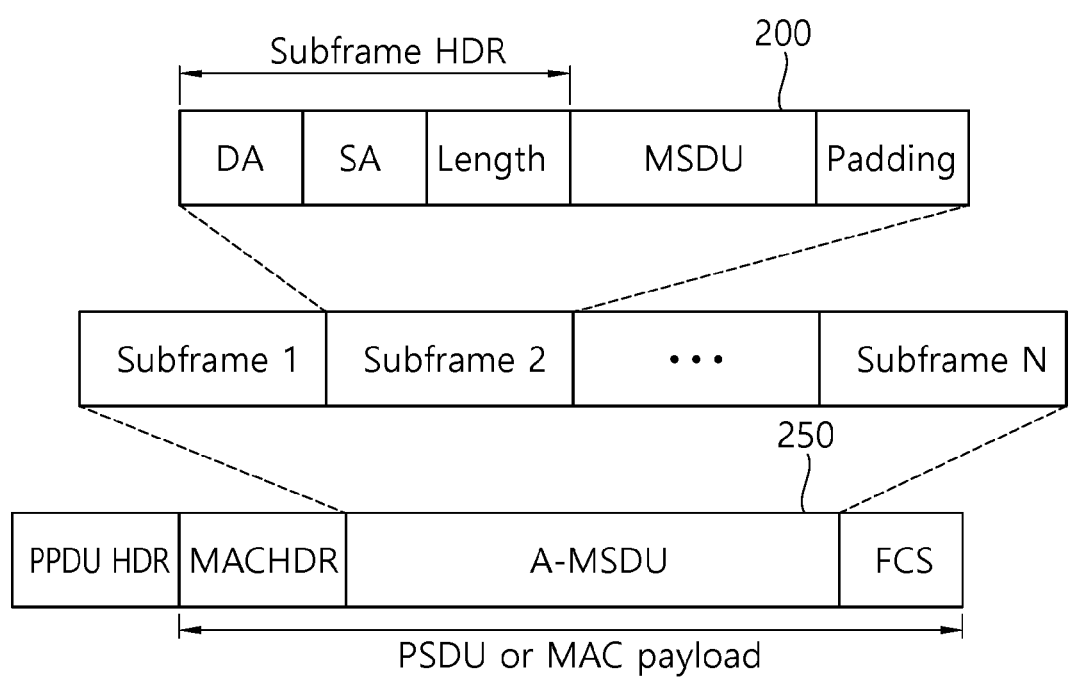
FIG. 2 is a conceptual diagram illustrating an A-MSDU.

FIG. 2 is a conceptual diagram illustrating an A-MSDU.

In a wireless LAN system, a method for performing aggregation on a data frame in order to reduce medium access control (MAC) error overhead has been defined. A MAC service data unit (MSDU) 200, which is generated in an application layer for the aggregation of the data frame, may be processed with aggregation (i.e., aggregated) in a higher layer of the MAC layer so as to be generated as a single data unit. The MSDU that is aggregated in the higher layer of the MAC layer may be defined by using the term aggregate-MSDU (A-MSDU) 250. The A-MSDU 250 may be generated based on an aggregation of multiple MSDUs 200 each having the same priority level and each having the same receiver address (RA).

A plurality of A-MSDU subframes may be grouped so as to form a single A-MSDU 250. More specifically, the A-MSDU 250 may include a plurality of A-MSDU subframes, and an A-MSDU subframe may include a subframe header, an MSDU, and a padding bit. The subframe header may include a destination address (DA), a source address (SA), and a MSDU length. The padding bit may be used in order to configure a total length of the A-MSDU subframe to have a total length that is equal to a multiple of a predetermined number (e.g., a multiple of 4 octets).

Unlike the single MSDU, instead of being fragmented (or processed with fragmentation), the A-MSDU 250 may be configured as a QoS data MAC protocol data unit (MPDU) and may then be transmitted. For example, the A-MSDU 250 may be transmitted by a high throughput (HT) STA of a management information base (MIB) field. An HT STA has a capability of performing de-aggregation of the A-MSDU 250, and the HT-STA verifies whether or not an a-MSDU 250 exists in a QoS field of a MAC header of the received PPDU, and, then, the HT STA may de-aggregate the A-MSDU 250.

In case the ACK policy of the HT STA is configured as a normal ACK, the A-MSDU 250 may not be aggregated as an A-MPDU. Additionally, whether or not the A-MSDU 250 can be aggregated to the A-MPDU may vary depending upon whether or not a block acknowledgement (ACK) agreement has been established (or made) for each traffic identifier (TID). Additionally, even if a block ACK agreement has been established with respect to a TID, in case an A-MSDU block ACK supportability indicator of an add block acknowledgement (ADDBA) response frame of the receiving end corresponding to the add block acknowledgement (ADDBA) request frame indicates that block ACK is not supported, the A-MSDU 250 may not be included in the A-MPDU.

Figure 3:
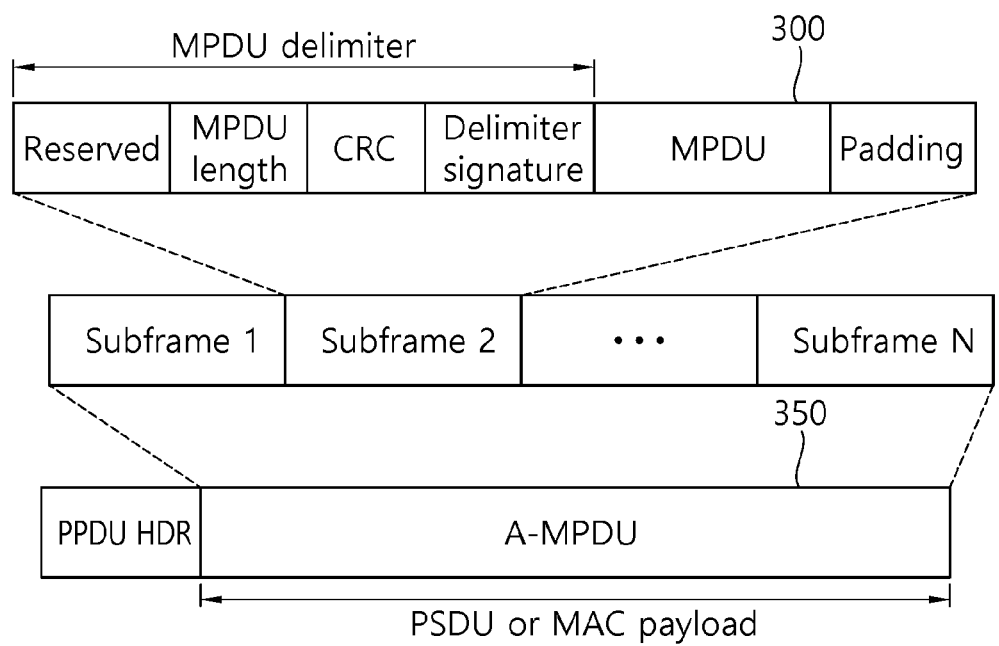
FIG. 3 is a conceptual diagram illustrating an A-MPDU.

FIG. 3 is a conceptual diagram illustrating an A-MPDU.

Referring to FIG. 3, a single A-MPDU 350 may be configured at a lower portion of the MAC layer by grouping multiple MPDUs 300 each having the same receiver address (RA), TID, and ACK policy.

The A-MPDU 350 is configured of one or more A-MPDU subframes, and each A-MPDU subframe may include an MPDU delimeter and an MPDU 300.

An MPDU delimeter may be used in order to determine whether or not an error exists in the A-MPDU subframe(s) configuring the A-MPDU 350. Multiple A-MPDU subframes may configure a single A-MPDU 350.

Whether or not the reception of the A-MPDU 350 is successful may be indicated based on a block ACK. The A-MPDU 350 may be configured only for a TID that has established an FIT-immediate BA agreement, and values of duration/ID fields of the MPDU 300 configuring the A-MPDU 350 may be set to be equal to one another.

The A-MPDU (or MPDU) may be included in a physical layer (PHY) service data unit (PSDU). A PSDU and a PPDU header (PHY preamble and PHY header) may configure a PHY protocol data unit (PPDU). The A-MPDU (or MPDU) may also be interpreted as a data unit that is equal to a frame.

FIG. 4 illustrates a block ACK operation.

The block ACK mechanism was adopted for the transmission of a block ACK frame including ACK information corresponding to the multiple frames, which were transmitted during a transmission opportunity (TXOP) duration (or period). In case the block ACK mechanism is used, just as in the A-MSDU or A-MPDU, the overhead for the data transmission and reception procedures may be decreased, and the efficiency of the MAC layer may be decreased.

Referring to FIG. 4, the block ACK transmission corresponding to an A-MPDU of one TID may be performed based on a setup procedure, a transmission procedure, and a tear down procedure. The setup procedure may correspond to a procedure requesting for a block ACK session and responding to the request.

As an identifier that can be used by a higher layer, the TID may be used to identify the MSDU. For example, the TID may have 16 values that are identified based on a traffic stream (TS) and a traffic category (TC). The TID may be allocated to the MSDU from a higher layer that is higher than the MAC layer. The TC may be used to identify MSDUs having different user priority levels. The TS may indicate a group of MSDUs being transmitted based on a specific traffic specification (TSPEC). The TSPEC may indicate specific quality of service (QoS) characteristics of a data flow between STAs.

During the transmission procedure, the STA of the transmitting end (hereinafter referred to as the transmitting STA) may transmit consecutive data to the STA of the receiving end (hereinafter referred to as the receiving STA), and the receiving STA may transmit an aggregated response corresponding to the consecutive data to the transmitting STA.

During the tear down procedure, the setup block ACK may be torn down (or cancelled).

More specifically, during the setup procedure, the transmitting STA may transmit an add block acknowledgement (ADDBA) request frame to the receiving STA, and the receiving STA may transmit an ADDBA response frame to the transmitting STA. More specifically, the transmitting STA may transmit an ADDBA request frame, which corresponds to a management frame, to the receiving STA. The ADDBA request frame may request a block ACK agreement corresponding to the current TID. The ADDBA request frame may transmit information on block ACK policy types, transmission buffer size of the transmitting STA, a timeout value of a block ACK session, a starting sequence number (SSN), and so on, to the receiving STA. After receiving the ADDBA request frame, the receiving STA may transmit an ADDBA response frame to the transmitting STA as a response to the received ADDBA request frame. The ADDBA response frame may include a block ACK agreement status, an ACK policy, a buffer size, a timeout value, and so on.

During the transmission procedure, the transmitting STA may transmit an A-MPDU to the receiving STA. In case the transmission condition of a block ACK request (BAR) frame corresponding to the A-MPDU is satisfied, the transmitting STA may transmit a BAR frame to the receiving STA. In case the transmission of the A-MPDU performed by the transmitting STA is successful, the receiving STA that has received the BAR frame may transmit a block ACK corresponding to the A-MPDU to the transmitting STA.

The tear down procedure may be carried out in case set up time values of inactivity timers, which are set up in the transmitting STA and the receiving STA, are expired, or if there are no more data that are to be transmitted with respect to the corresponding TID. For example, with the expiration of the timeout value set up in the inactivity timer for block ACK error recovery, a delete block acknowledgement (DELBA) frame may be transmitted to the receiving STA or the transmitting STA, and, then, the block ACK session may be ended. In case the transmitting STA receives the block ACK, the inactivity timer of the transmitting STA may be re-set. In case the receiving STA receives the MPDU and the block ACK request frame, the inactivity timer of the receiving STA may be re-set.

The block ACK frame may include a block ACK start sequence control field and a block ACK bitmap.

The block ACK start sequence control field may include information on a sequence number of a data unit that is indicated by a first bit being included in the block ACK bitmap. In other words, the block ACK start sequence control field may include information on a starting sequence number (SSN), which corresponds to a sequence number of a data unit that is indicated by a first bit being included in the block ACK bitmap.

Each of a plurality of bits being included in the block ACK bitmap may indicate the success or failure in the decoding for each of a plurality of data units (e.g., MSDU). The first bit being included in the block ACK bitmap may indicate the success or failure in the reception of the data unit of the sequence number, which is indicated by the block ACK start sequence control field. The remaining bits that are included in the block ACK bitmap may sequentially indicate the success or failure in the decoding of the data units corresponding to the remaining sequences. More specifically, an nth bit being included the block ACK bitmap may indicate the success or failure in the reception of a data unit having a sequence number corresponding to SSN+n.

The block ACK bitmap may have a compressed format. A bit that is included in the block ACK bitmap having the compressed format may also indicate the success or failure in the reception of a plurality of data units (e.g., 64 MSDUs and A-MSDU).

Furthermore, in addition to the block ACK bitmap corresponding to only one TID, in accordance with the configuration, the block ACK bitmap may also include block ACK bitmaps corresponding to a plurality of TIDs.

In the conventional wireless LAN system, a frame check sequence (FCS) for performing error detection on a MAC header and a MAC body (or MSDU, A-MSDU, frame body) was included and transmitted in a frame. More specifically, a FCS for performing cyclic redundancy check (CRC) only on the MAC header of the frame was not included in the frame.

An STA or AP operating the conventional wireless LAN system may check whether or not an error has occurred in a MAC header and MAC body, which are included in the received frame based on the FCS being included in the frame. However, the STA or AP was not required to separately determine whether or not an error has occurred in the MAC header. In the wireless LAN system, the MAC header of the frame includes important information for decoding (or interpreting) the MAC body later on. Therefore, determining the occurrence or non-occurrence of an error in the MAC header may be an important issue for enhancing the performance of the wireless LAN system.

The exemplary embodiment of the present invention discloses a method for performing error check only for the MAC header by adding a CRC to the MAC header of a plurality of A-MPDU subframes (or MPDUs) being included in an A-MPDU. Furthermore, the exemplary embodiment of the present invention discloses a method for reducing overhead of the MAC header, which is included in each of the plurality of A-MPDU subframes being included in the A-MPDU.

Figure 5:
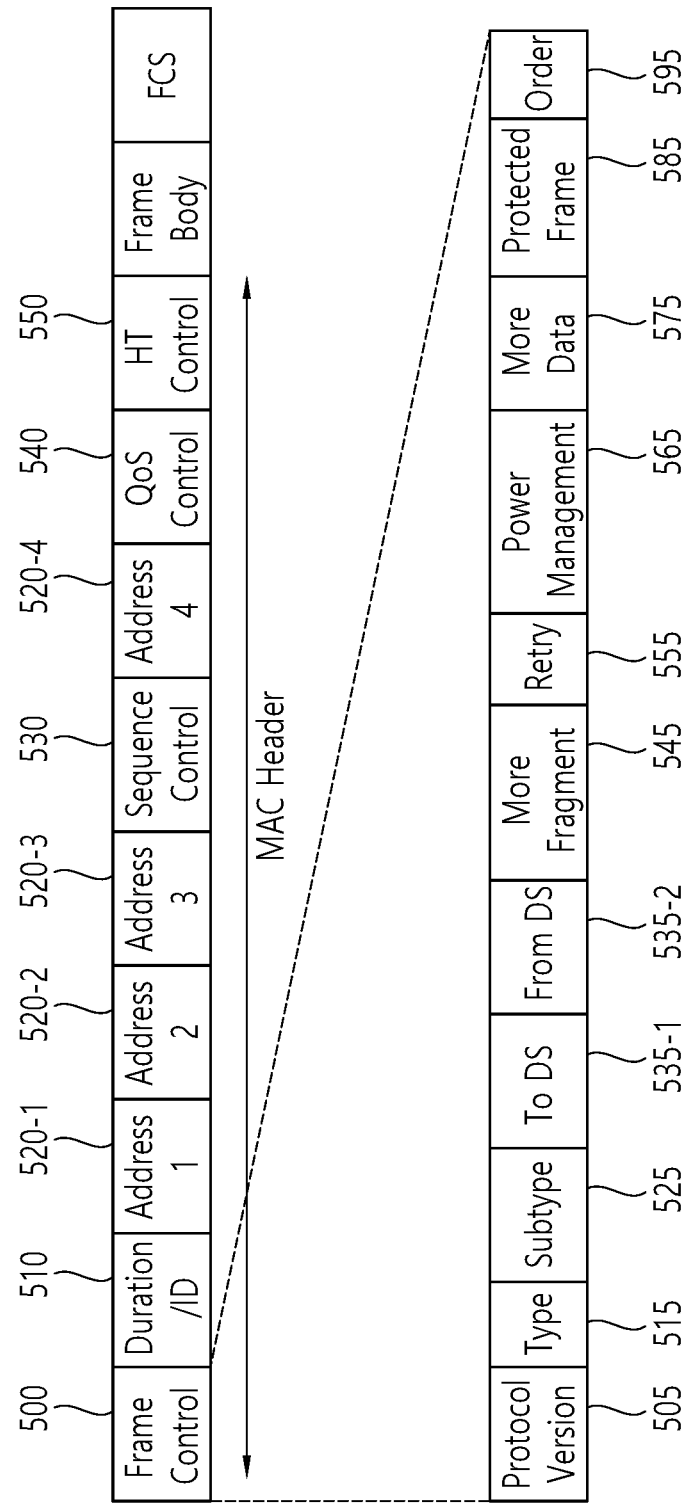
FIG. 5 is a conceptual view illustrating a structure of a MAC header.

FIG. 5 is a conceptual view illustrating a structure of a MAC header.

FIG. 5 discloses a MAC header structure being included in a MDPU (or frame).

The MAC header structure is disclosed in 8.2 MAC frame formats of IEEE Standard for Information technology Telecommunications and information exchange between systems Local and metropolitan area networks Specific requirements Part 11: Wireless LAN Medium Access Control (MAC) and Physical Layer (PHY) Specifications, which was disclosed in October, 2013. The MAC header structure will hereinafter be briefly described.

Referring to FIG. 5, the MAC header may include a frame control field 500, a duration/identifier (ID) field 510, an address field 520, a sequence control field 530, a quality of service (QoS) control field 540, and a high throughput (HT) control field 550.

The frame control field 500 may include a protocol version field 505, a type field 515, a sub-type field 525, a To DS field 535-1, a From DS field 535-2, a MoreFragments field 545, a Retry field 555, a power control field 565, a More Data field 575, a Protected Frame field 585, and an Order field 595.

The protocol version field 505 may include information on a communication protocol version being used in the current wireless LAN.

The type field 515 and the sub-type field 525 may be configured for indicating functions of the frame. More specifically, the type field 515 may include information for indicating to which type, among a management frame, a control frame, and a data frame, the frame corresponds. The sub-type field 525 may include information for indicating a specific frame among a plurality of frames, which are included in the frame types indicated in the type field 515.

The To DS field 535-1 and the From DS field 535-2 may include information for interpreting Address field1 to Address field4.

The MoreFragments field 545 may include information indicating the presence or absence of other fragments corresponding to the same MSDU.

The Retry field 555 may include information for indicating whether or not the frame that is currently being transmitted corresponds to a re-transmission frame of a previous frame.

The power control field 565 may include information for indicating whether or not operation is performed in the power save mode.

The More Data field 575 may include information for indicating the presence or absence of a buffer in the additional data.

The Protected Frame field 585 may include information for indicating whether or not the MAC body (or frame body) includes information being processed by an encryption algorithm.

The Order field 595 may include information for indicating transmission or non-transmission of an aligned MSDU.

The duration/ID field 510 may include duration information for the setting of a NAV, and identification information on an STA.

Each of Address field1 520-1, Address field2 520-2, Address field3 520-3, and Address field4 520-4 may include information on a source address, a destination address, a transmitting STA address, a receiving STA address, a basic service set identifier (BSSID), and so on, in accordance with the To DS field 535-1 and the From DS field 535-2.

The sequence control field 530 may include information on a sequence number and a fragment number of the frame (or MAC body).

The QoS control field 540 may include information on a traffic identifier (TID), information on an end of service period (EOSP), and information on an acknowledgement (ACK) policy. The TID may include information on a user priority (UP) in accordance with a traffic category (TC).

The HT control field 550 may include a link adaptation field, a calibration position field, a calibration sequence field, a channel state information (CSB/Steering field, a Null Data Packet (NDP) announcement field, and so on.

A link adaptation sub-field may include a Training request (TRQ) field, a Modulation and Coding Scheme (MCS) Request or Antenna Selection (ASEL) Indication (MAI) field, a MCS Feedback Sequence Identifier (MFSI) field, and a MCS Feedback and Antenna Selection Command/data (MFB/ASELC) field.

In case a sounding PPDU transmission is requested to a responder, the TRQ sub-field is set to 1. And, in case a sounding PPDU transmission is not requested to the responder, the TRQ sub-field is set to 0. And, if the MAI sub-field is set to 14, the MAI sub-field may indicate ASEL indication, and the MFB/ASELC sub-field may be interpreted as Antenna Selection Command/data. Otherwise, the MAI sub-field may indicate MCS Request, and the MFB/ASELC sub-field may be interpreted as MCS feedback. In case the MAI sub-field indicates a MCS Request (MRQ), in case no MCS feedback is requested, the MAI sub-field is set to 0, and, in case a MCS feedback is requested, the MAI sub-field is set to 1. The sounding PPDU refers to a PPDU carrying a training symbol that may be used for channel estimation.

Figure 6:
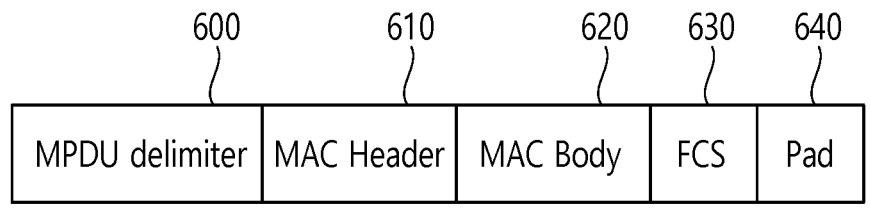
FIG. 6 is a conceptual view illustrating a conventional A-MPDU subframe.

FIG. 6 is a conceptual view illustrating a conventional A-MPDU subframe.

FIG. 6 discloses an A-MPDU subframe included in an A-MPDU, which is supported in the conventional (or legacy) wireless LAN.

Referring to FIG. 6, the A-MPDU subframe included in the A-MPDU may include a MPDU delimiter 600, a MAC header 610, a MAC body (or frame body) 620, a frame check sequence (FCS) field 630, and a padding bit 640.

The MPDU delimiter 600 may include information on a MPDU length, a CRC bit, and specific pattern information indicating a MPDU delimiter. An STA receiving the A-MPDU may recognize the MPDU delimiter 600 based on the specific pattern information. Also, the MPDU delimiter 600 may include information on a length of a MPDU (e.g., MAC header 610, MAC body 620, FCS 630) being included in an A-MPDU subframe. Therefore, after recognizing the MPDU delimiter within the A-MPDU based on the specific pattern information included in the MPDU delimiter 600, the STA may extract a MPDU from the A-MPDU subframe based on the length information of the MPDU included in the MPDU delimiter 600.

The CRC bit included in the MPDU delimiter 600 may correspond to an error check bit for checking errors occurring in the MPDU delimiter 600. More specifically, the CRC bit may correspond to an error check bit for determining the occurrence or non-occurrence of an error in the information on the MPDU length.

The MAC header 610 may have different lengths depending upon the circumstances. As described above, one A-MPDU may include a plurality of A-MPDU subframes. Each of the plurality of MPDUs being included in each of the plurality of A-MPDU subframes may include each of a plurality of MAC headers. Among the plurality of fields being included in each of the above-described plurality of MAC headers, part of the fields may be identical to one another.

The MAC body 620 may include traffic data that may be decoded based on the MAC header.

The FCS field 630 may include error check bits (e.g., a CRC having the size of 32 bits) being used for checking error occurring in the MAC header and the MAC body. The error check bits being included in the FCS field may be determined by being calculated in accordance with the MAC header and the MAC body.

The padding bit 640 may include a bit for configuring (or setting) the length of the A-MPDU subframe to a unit of 4 octets.

Figure 7:
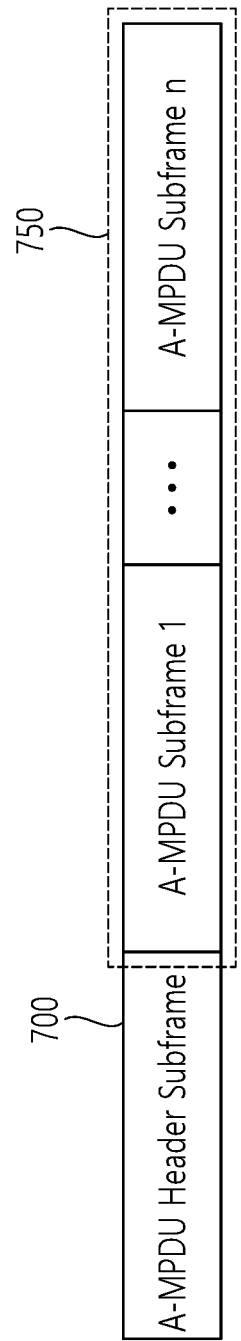
FIG. 7 is a conceptual view illustrating an A-MPDU according to an exemplary embodiment of the present invention.

FIG. 7 is a conceptual view illustrating an A-MPDU according to an exemplary embodiment of the present invention.

Referring to FIG. 7, the A-MPDU may include an A-MPDU header subframe 700 and A-MPDU subframes 750.

As an MPDU, an A-MPDU header subframe 700 may include only a MAC header, an FCS, and a padding bit excluding a MAC body.

As an MPDU, an A-MPDU subframe 750 may include only a MAC header, a MAC body, an FCS, and a padding bit.

The MAC header included in the A-MPDU header subframe 700 may include a common header field. The MAC header included in the A-MPDU header subframe 700 may also be expressed by using the term common MAC header. The common header field may correspond to a field including header information that is common to the plurality of A-MPDU subframes being included in the A-MPDU. The FCS field included in the A-MPDU header subframe 700 may include an error check bit that is included only for the MAC header. The A-MPDU header subframe 700 may be located at a position within the A-MPDU where the A-MPDU header subframe 700 can be decoded earlier than the remaining A-MPDU subframes 750.

The MAC header included in the A-MPDU subframe 750 may include a unique header field. The MAC header included in the A-MPDU subframe 750 may also be expressed by using the term compressed MAC header (or unique MAC header). The unique header field may include individual sets of information corresponding to the A-MPDU subframes 750 excluding the common header field. The FCS may include error check bits corresponding to the MAC header and the MAC body. According to the exemplary embodiment of the present invention, an additional FCS including an error check bit only for the MAC header may be included in the A-MPDU subframes 750.

In case the A-MPDU header subframe 700 includes a common header field, and in case the A-MPDU subframes 750 does not include a common header field, overhead, which is caused by each of the plurality of MAC headers including a common set of header information, each of the plurality of MAC headers being included in each of the plurality of A-MPDU subframes, which are included in the conventional (or legacy) A-MPDU, may be reduced. More specifically, by transmitting common header information, such as a receiver address, a transmitter address, a BSSID, an ACK policy, a Key ID, a duration/ID, and so on, through an A-MPDU header subframe 700, unnecessarily repeated transmission of the MAC header information may be reduced. The MAC body, which is included in the A-MPDU subframe 750, may be decoded (or interpreted) based on the common MAC header included in the A-MPDU header subframe 700 and the compressed MAC header included in the A-MPDU subframe 750.

Furthermore, in case a separate FCS corresponding to the common MAC header and the compressed MAC header, which are respectively included in the A-MPDU header subframe 700 and each of the A-MPDU subframes 750, is included, since the occurrence or non-occurrence of an error may be separately performed only in the MAC header, unnecessary transmission may be reduced, thereby enhancing the performance of the wireless LAN.

Hereinafter, the A-MPDU header subframe 700 and the A-MPDU subframe 750 will be disclosed in detail according to the exemplary embodiment of the present invention.

Figure 8:
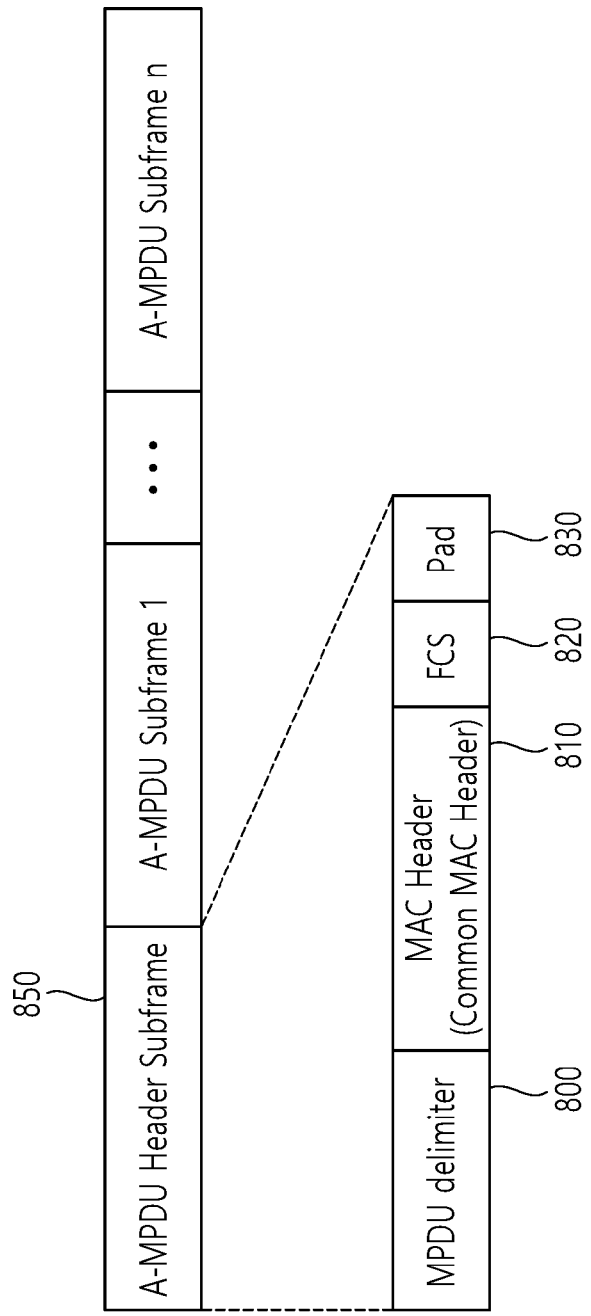
FIG. 8 is a conceptual view illustrating an A-MPDU header subframe according to an exemplary embodiment of the present invention.

FIG. 8 is a conceptual view illustrating an A-MPDU header subframe according to an exemplary embodiment of the present invention.

Referring to FIG. 8, an A-MPDU header subframe 850 may include a MPDU delimiter 800, a MAC header 810, an FCS field 820, and a padding bit 830.

The MPDU delimiter 800 may include information on a length of the MPDU (MAC header and FCS field).

The MAC header 810 may include a common header field. The MAC header 810, which is included in the A-MPDU header subframe 800, by also be expressed by using the term common MAC header.

As described above, each of the plurality of MAC headers being respectively included in each of the plurality of A-MPDU subframes, which are included in the A-MPDU that is supported in the conventional wireless LAN system, may include a common set of header information. More specifically, since the A-MPDU may include is transmitted to one STA, each of the plurality of MAC headers of each of the plurality of A-MPDU subframes being included in the conventional A-MPDU, which is transmitted to one STA, may include common header information. A field including such common header information may be defined by using the term common header field. In other words, the common header field may correspond to a field of the MAC header corresponding to the header information that is common to each of the plurality of A-MPDU subframes, which are included in the conventional A-MPDU.

According to the exemplary embodiment of the present invention, a common MAC header 810 of the A-MPDU header subframe 850 may include a common header field. Also, in the A-MPDU, a compressed MAC header, which is included in each of the A-MPDU subframes excluding the A-MPDU header subframe 850, may only include a unique header field including individual header information corresponding to the A-MPDU subframe excluding the common header field.

In case the compressed MAC header of the A-MPDU subframes excluding the A-MPDU header subframe 850 includes only a unique header field, the overhead caused by the MAC header may be reduced as compared to the MAC header of the conventional A-MPDU subframe.

For example, the common header field may correspond to the duration/Id field, the address field, and so on, and the unique header field may correspond to the frame control field, the sequence control field, and so on. The QoS control field and the HT control field may be included in the common header field or the unique header field. The above-described differentiation between the common header field and the unique header field is merely exemplary. And, therefore, the common header field and the unique header field may be categorized (or classified) in accordance with diverse standards.

The FCS field 820 may include an error check bit corresponding to the common MAC header 810, which includes the common header field being included in the A-MPDU header subframe 850. Moore specifically, the error check bit included in the FCS field 820 may be calculated for the common header field.

The padding bit 830 may include bits for configuring the length of the A-MPDU header subframe 850 to match a 4-octet unit.

The A-MPDU header subframe 850 may be positioned so as to be decoded earlier than (or before) the remaining A-MPDU subframes within the A-MPDU.

In FIG. 8, although a case when the MAC body is not included in the A-MPDU header subframe 850 is assumed, depending upon the circumstances, the MAC body may be included in the A-MPDU header subframe 850, and the format of such A-MPDU header subframe 850 is also included in the scope of the claims of the present invention.

Figure 9:
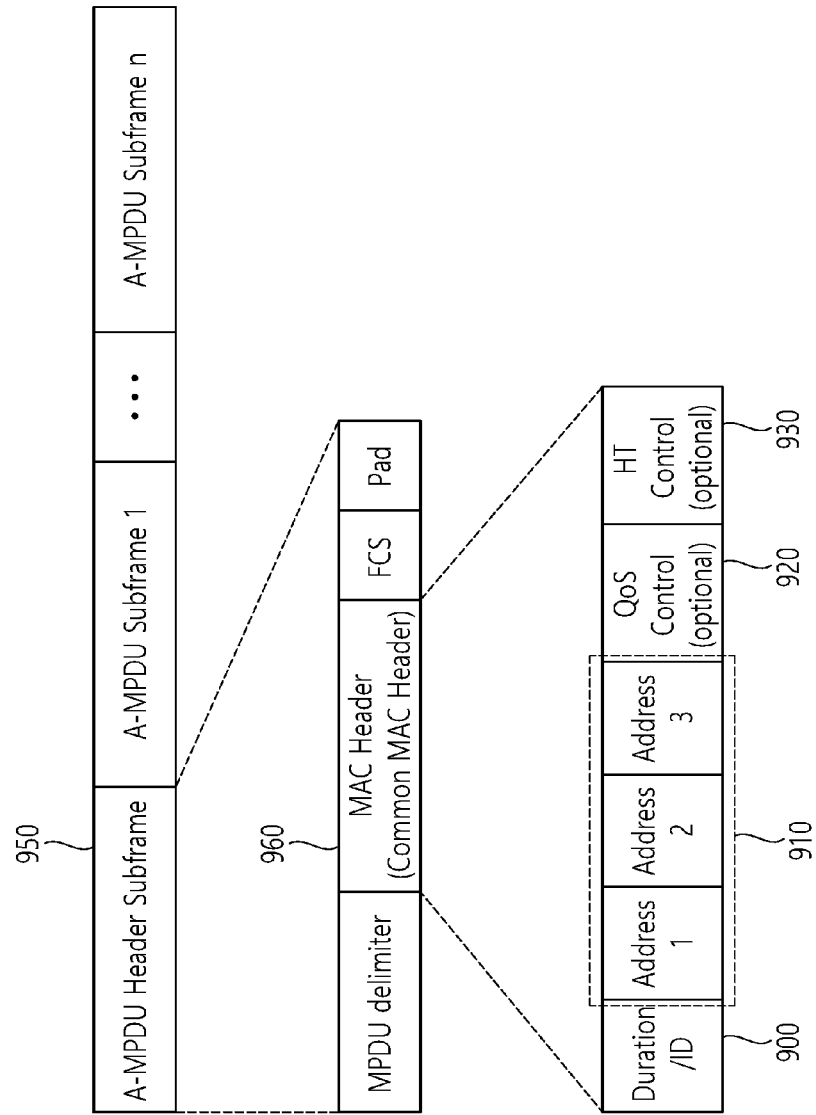
FIG. 9 is a conceptual view illustrating a common MAC header of an A-MPDU header subframe according to an exemplary embodiment of the present invention.

FIG. 9 is a conceptual view illustrating a common MAC header of an A-MPDU header subframe according to an exemplary embodiment of the present invention.

FIG. 9 discloses a common header field that is included in a common MAC header 960 of an A-MPDU header frame 950.

Referring to FIG. 9, the common MAC header 960 may include a duration/ID field 900, an address field 910, a QoS control field 920, and an HT control field 930.

Duration information for NAV setting or identification information of a transmitting STA may be the same for each of the plurality of A-MPDU subframes being included in the A-MPDU. Therefore, the duration/ID field 900 may be included in the common header field.

A source address, a destination address, a transmitting STA address, and a receiving STA address may also be the same for each of the A-MPDU subframes. Therefore, the address field 910 may be included in the common header field.

Information being included in each of the QoS control field 920 and the HT control field 930 may also be the same for each of the plurality of A-MPDU subframes. Therefore, each of the QoS control field 920 and the HT control field 930 may be included in the common header field. As a unique header field, the QoS control field 920 and the HT control field 930 may also be included in a compressed MAC header, which will be described in detail later on in FIG. 10. And, according to another exemplary embodiment of the present invention, each of the QoS control field 920 and the HT control field 930 may be respectively divided in accordance with information being included each of the QoS control field 920 and the HT control field 930 and may then be included in the common MAC header or the compressed MAC header.

The common header field included in the common MAC header, which is disclosed in FIG. 9, is an exemplary field. Another combination of the MAC header field may be included in the common header, and such exemplary embodiment may also be included in the scope of the claims of the present invention.

Figure 10:
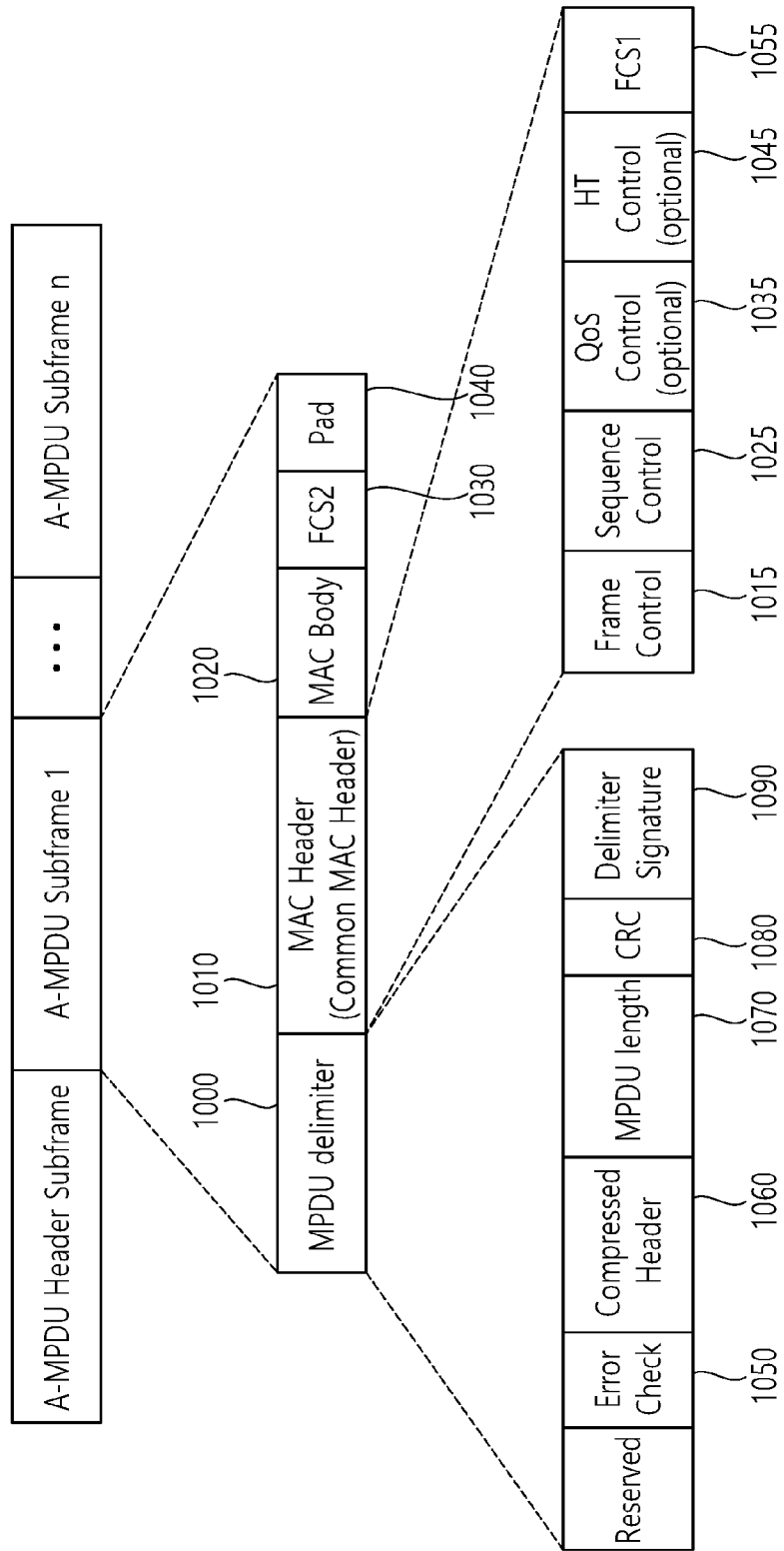
FIG. 10 is a conceptual view illustrating an A-MPDU subframe according to an exemplary embodiment of the present invention.

FIG. 10 is a conceptual view illustrating an A-MPDU subframe according to an exemplary embodiment of the present invention.

FIG. 10 discloses an A-MPDU subframe including a compressed MAC header.

Referring to FIG. 10, the A-MPDU subframe may include a MPDU delimiter 1000, a compressed MAC header 1010, a first FCS field (optional) 1055, a MAC body 1020, a second FCS field 1030, and a padding bit 1040. In the drawing, it is assumed that the first FCS field 1055 is included in the MAC header 1010. However, the first FCS field 1055 may also be included in the A-MPDU subframe as a separate structure.

The MPDU delimiter 1000 of the A-MPDU subframe may include an error check field 1050, a compressed header field 1060, an MPDU length field 1070, a CRC 1080, and a delimiter signature 1090.

The error check field 1050 may include information indicating whether or not the first FCS field 1055, which includes an error check bit for the compressed MAC header, is included in the A-MPDU subframe. For example, in case the value of the error check field 1050 is equal to 1, this may indicate that the first FCS field 1055 including the error check bit for the MAC header 1010 is included in the A-MPDU subframe. Conversely, in case the value of the error check field 1050 is equal to 0, this may indicate that the first FCS field 1055 including the error check bit for the MAC header 1010 is not included in the A-MPDU subframe.

The compressed header field 1060 may include information indicating whether or not the MAC header 1010 is a compressed MAC header. For example, in case the value of the compressed header field 1060 is equal to 1, this may indicate that the MAC header 1010 being included in the A-MPDU subframe is a compressed MAC header. Conversely, in case the value of the compressed header field 1060 is equal to 0, this may indicate that the MAC header 1010 being included in the A-MPDU subframe is not a compressed MAC header.

The MPDU length field 1070 may include information on a length of the MPDU. For example, the MPDU length field 1070 may include information on the lengths of octet units corresponding to the compressed MAC header 1010, the first FCS field (optional) 1055, the MAC body 1020, and the second FCS field 1030, which are transmitted after the MPDU delimiter 1000.

The CRC 1080 may include an error check bit corresponding to the information included in the MPDU delimiter 1000. More specifically, the CRC 1080 may include information for checking errors occurring in the error check field 1050, the compressed header field 1060, and the MPDU length field 1070, which are included in the MPDU delimiter 1000.

The delimiter signature 1090 may include pattern information for detecting the MPDU delimiter 1000, when performing scanning of the delimiter by the STA.

Referring back to the A-MPDU subframe, the compressed MAC header 1010 may include a unique header field. The unique header field may include individual header information corresponding to the A-MPDU subframe. For example, the unique header field may include a frame control field 1015, a sequence control field 1025, a QoS control field 1035, and an HT control field 1045. Since each of the frame control field 1015, the sequence control field 1025, the QoS control field 1035, and the HT control field 1045 may also include unique information corresponding to each of the plurality of A-MPDU subframes, each of the frame control field 1015, the sequence control field 1025, the QoS control field 1035, and the HT control field 1045 may be defined as a unique header field and may be included in the compressed MAC header 1010.

The first FCS field 1055 may include an error check bit corresponding to the compressed MAC header 1010. In case the first FCS field 1055 is included, it may be possible to determine whether or not an error has occurred in the compressed MAC header 1010. In case an error has occurred in the MAC header 1010, decoding may be performed on the remaining MAC body 1020 part excluding the error-occurring MAC header 1010 based on information (e.g., information related to the MAC header or information for decoding the MAC body) included in the PPDU header (or PHY header). In the conventional wireless LAN system, the STA cannot determine whether or not an error has occurred in the MAC header 1010. Therefore, in case an error has occurred in the MAC header 1010, re-transmission of the frame was requested through a re-transmission procedure. However, according to the exemplary embodiment of the present invention, even in a case when an error has occurred in the MAC header 1010, decoding on the MAC body 1020 may be successfully performed. Therefore, the overhead that is caused by the re-transmission may be reduced.

The first FCS field 1055 may be optionally included in the A-MPDU subframe. As shown below in FIG. 11, the first FCS field 1055 may not be included in the A-MPDU subframe.

The MAC body 1020 may include traffic data that are decoded based on a common MAC header, which is included in the A-MPDU header subframe, and a compressed MAC header 1010, which is included in the A-MPDU subframe. As described above, in case an error has occurred in the MAC header 1010, the MAC body 1020 may be decoded based on the PPDU header.

The second FCS field 1030 may include an error check bit for checking errors occurring in the compressed MAC header 1010, the first FCS field (optional) 1055, and the MAC body 1020. Alternatively, the second FCS field 1030 may also include an error check bit for checking errors only in the MAC body 1020.

Whether or not an error has occurred in the MAC body 1020 may be determined based on the second FCS 1030. For example, as a result of the error check performed based on the first FCS 1055, in case it is determined that an error has not occurred, and, in case it is determined that an error has occurred as a result of the error check performed based on the second FCS 1030, the STA may determine that an error has occurred in the MAC body 1020.

In the conventional wireless LAN system, an error corresponding to the MAC body 1020 could not be separately determined. In the conventional wireless LAN system, the STA determined that an error has occurred in the MPDU (MAC header+MAC body) based on the FCS, and, then, the STA carried out the re-transmission procedure accordingly. However, in case of the present invention, in case an error does not occur in the MAC header 1010, the information being included in the MAC header 1010 may be used by the STA. For example, in case an error does not occur in the MAC header 1010, and, in case an error occurs in the MAC body 1020, the STA may set up a network allocation vector (NAV) and set up another BSS threshold value based on the information on the MAC header 1010. Accordingly, inefficient channel access using an extended interframe space (EIFS) may be enhanced.

Additionally, in case it is determined that error has occurred in both the MAC body 1020 and the MAC header 1010, in the conventional wireless LAN system, the STA performed the re-transmission procedure. However, in case of using the A-MPDU according to the exemplary embodiment of the present invention, the STA may successfully perform NAV setting, other BSS threshold value setting, and so on, based on information related to the MAC header included in the PPDU header (or information for performing MAC body decoding included in the PPDU header). Accordingly, inefficient channel access using an EIFS may be enhanced.

Figure 11:
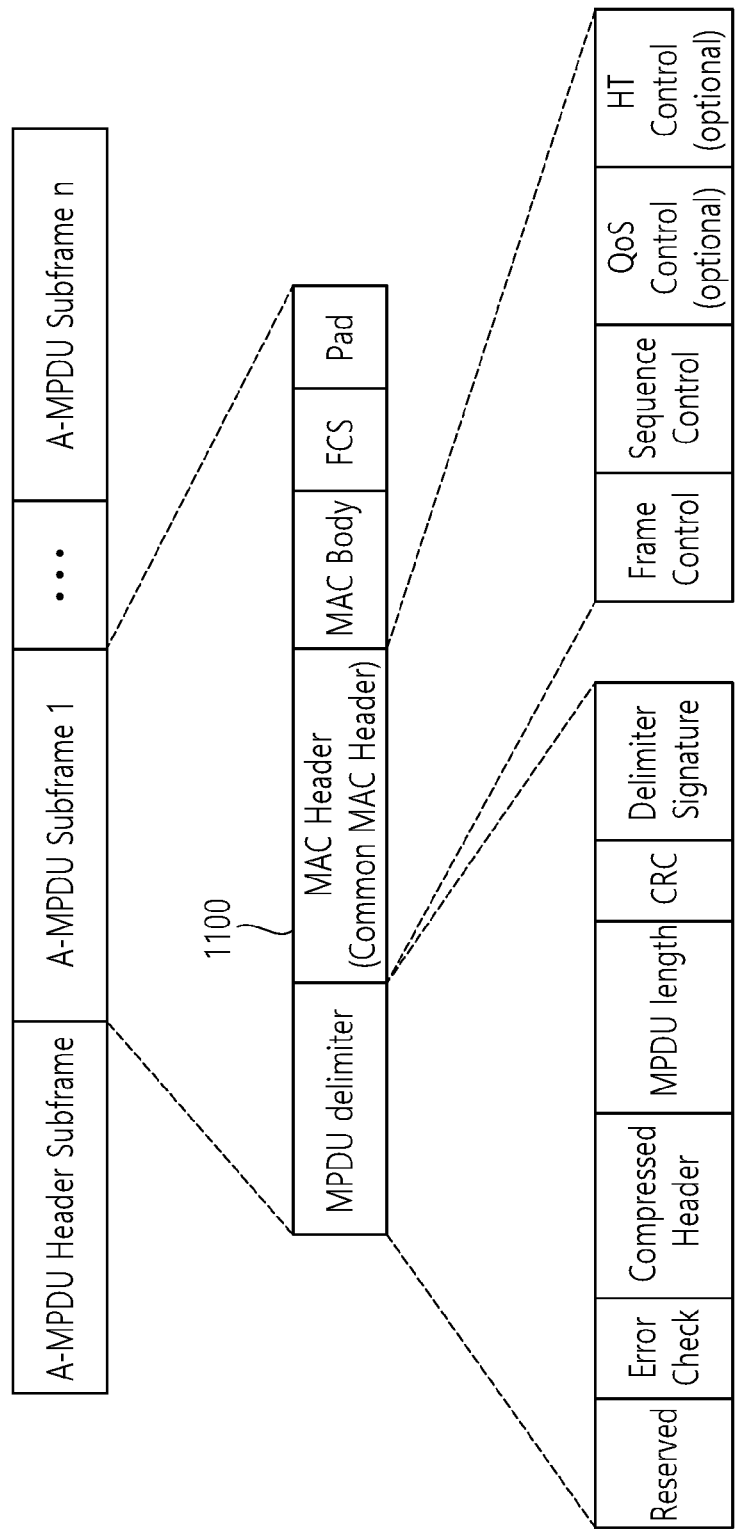
FIG. 11 is a conceptual view illustrating an A-MPDU subframe according to an exemplary embodiment of the present invention.

FIG. 11 is a conceptual view illustrating an A-MPDU subframe according to an exemplary embodiment of the present invention.

FIG. 11 discloses an A-MPDU subframe including a compressed MAC header.

Referring to FIG. 11, an A-MPDU subframe that does not include a first FCS field is disclosed. The A-MPDU subframe may include only a compressed MAC header 1100.

Figure 12:
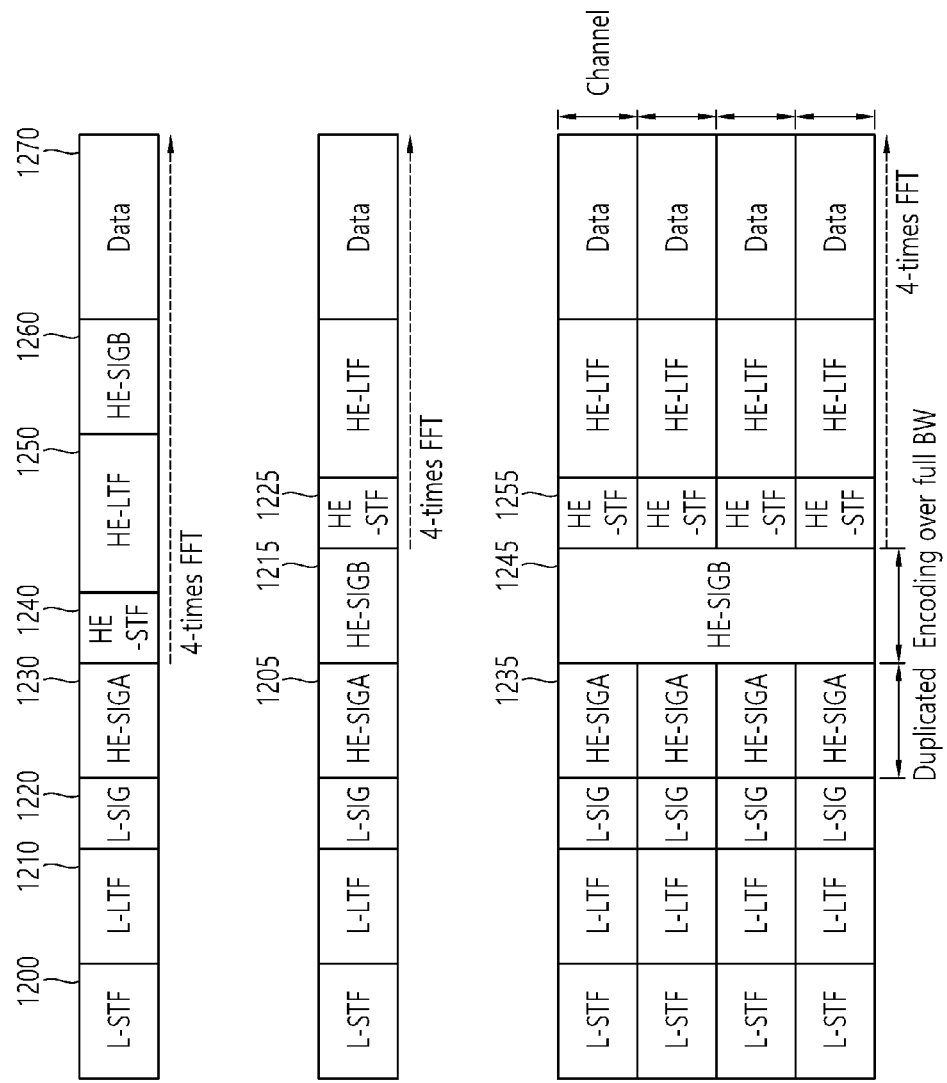
FIG. 12 is a conceptual view illustrating a PPDU format according to an exemplary embodiment of the present invention.

FIG. 12 is a conceptual view illustrating a PPDU format according to an exemplary embodiment of the present invention.

FIG. 12 discloses a PPDU format according to the exemplary embodiment of the present invention.

Referring to the upper part of FIG. 12, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PPDU may be divided into a legacy part, which consists of a part starting from the PHY header to the L-SIG, and a high efficiency (HE) part, which consists of a part after the L-SIG.

The L-STF 1200 may include a short training orthogonal frequency division multiplexing (OFDM) symbol. The L-STF 1200 may be used for frame detection, automatic gain control (AGC), diversity detection, and coarse frequency/time synchronization.

The L-LTF 1210 may include a long training orthogonal frequency division multiplexing (OFDM) symbol. The L-LTF 1210 may be used for fine frequency/time synchronization and channel prediction.

The L-SIG 1220 may be used for transmitting control information. The L-SIG 1220 may include information on data transmission rate, data length, and so on.

The HE-SIG A 1230 may also include identification information for indicating a target STA that is to receive the PPDU. For example, the HE-SIG A 1230 may include an identifier of a specific STA (or AP) that is to receive the PPDU and information for indicating a group of specific STAs. Also, in case the PPDU is transmitted based on OFDMA or MIMO, the HE-SIG A 1230 may also include resource allocation information corresponding to the STA.

Additionally, the HE-SIG A 1230 may also include color bits information for BSS identification information, bandwidth information, tail bit, CRC bit, modulation and coding scheme (MCS) information on the HE-SIG B 1260, information on the number of symbols for the HE-SIG B 1260, and cyclic prefix (CP) (or guard interval (GI)) length information.

The HE-SIG A 1230 may also be expressed by using the term HE-SIG 1 (or first signal field).

The HE-STF 1240 may be used for enhancing automatic gain control estimation in a multiple input multiple output (MIMO) environment or an OFDMA environment.

The HE-LTF 1250 may be used for estimating a channel in a MIMO environment or an OFDMA environment.

The HE-SIG B 1260 may include information on a length modulation and coding scheme (MCS) of a physical layer service data unit (PSDU) for each STA and a tail bit, and so on. Additionally, the HE-SIG B 1260 may also include information on the STA that is to receive the PPDU and resource allocation information based on OFDMA (or MU-MIMO information). In case the resource allocation information based on OFDMA (or MU-MIMO information) is included in the HE-SIG B 1260, the resource allocation information may not be included in the FIE-SIG A 1230. The HE-SIG B 1260 may also be expressed by using the term HE-SIG 2 (or second signal field).

The inverse fast fourier transform (IFFT) size being applied to the HE-STF 1240 and the field after the HE-STF 1240 may be different from the IFFT size being applied to the field before the HE-STF 1240. For example, the IFFT size being applied to the HE-STF 1240 and the field after the HE-STF 1240 may be 4 times larger than the IFFT size being applied to the field before the HE-STF 1240. In case the STA may receive the HE-SIG A 1230 and may receive indication to receive a downlink PPDU based on the HE-SIG A 1230. In this case, the STA may perform decoding based on the HE-STF 1240 and the FFT size that is changed starting from the field after the HE-STF 1240. Conversely, in case the STA fails to receive indication to receive the downlink PPDU based on the HE-SIG A 1230, the STA may stop the decoding process and may perform network allocation vector (NAV) configuration. A cyclic prefix (CP) of the HE-STF 1240 may have a size that is larger than the CP of other fields, and, during such CP period, the STA may change the FFT size and may perform decoding on the downlink PPDU.

The order of the fields configuring the format of the PPDU, which is disclosed in the upper part of FIG. 12, may be varied. For example, as shown in the middle part of FIG. 12, the HE-SIG B 1215 of the HE part may be positioned immediately after the HE-SIG A 1205. The STA may decode the HE-SIG A 1205 and up to the HE-SIG B 1215 and may receive the required control information, and, then, the STA may perform NAV setting. Similarly, the IFFT size being applied to the HE-STF 1225 and the fields after the HE-STF 1225 may be different from the IFFT size being applied to the fields before the HE-STF 1225.

The STA may receive the HE-SIG A 1205 and the HE-SIG B 1215. In case the reception of the PPDU is indicated based on the HE-SIG A 1205, the STA may change the FFT size starting from the HE-STF 1225 and may then perform decoding on the PPDU. Conversely, in case the STA receives the HE-SIG A 1205, and in case the reception of the downlink PPDU is not indicated based on the HE-SIG A 1205, the STA may perform network allocation vector (NAV) setting.

Referring to the lower part of FIG. 12, a PPDU format for a multi-user (MU) OFDMA transmission is disclosed. For example, the AP may transmit a downlink frame or a downlink PPDU to a plurality of STAs by using a PPDU format for DL MU OFDMA transmission. Each of the plurality of downlink PPDUs may be transmitted to each of the plurality of STAs through different transmission resources (frequency resources or spatial streams). Within the PPDU, the fields before the HE-SIG B 1245 may each be transmitted in duplicated formats through different transmission resource. The HE-SIG B 1245 may be transmitted in a format that is encoded within the entire transmission resource. The fields after the HE-SIG B 1245 may include individual information for each of the plurality of STAs receiving the PPDU.

For example, the HE-SIG A 1235 may include identification information corresponding to a plurality of STAs that are to receive downlink data and information corresponding to channels through which downlink data of the plurality of STAs are transmitted.

In case the fields being included in the PPDU are transmitted through each of the transmission resources, a CRC corresponding to each of the fields may be included in the PPDU. Conversely, just as the HE-SIG B 1245, in case a specific field is encoded and transmitted within the entire transmission resource, a CRC corresponding to each of the fields may not be included in the PPDU. Accordingly, overhead corresponding to the CRC may be reduced.

Similarly, in the PPDU format for the MU transmission, the HE-STF 1255 and the fields after the HE-STF 1255 may be encoded based on a IFFT size that is different from that of the fields before the HE-STF 1255. Therefore, in case the STA receives the HE-SIG A 1235 and HE-SIG B 1245, and in case a reception of the PPDU is indicated based on the HE-SIG A 1235, the STA may change (or vary) the FFT size starting from the HE-STF 1255 and may then perform decoding of the PPDU.

Figure 13:
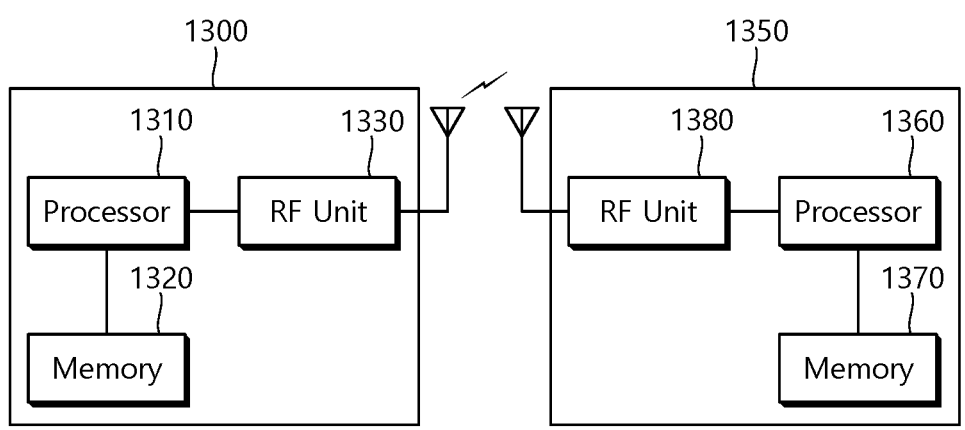
FIG. 13 is a block view illustrating a wireless device to which the exemplary embodiment of the present invention can be applied.

FIG. 13 is a block view illustrating a wireless device to which the exemplary embodiment of the present invention can be applied.

Referring to FIG. 13, the AP 1300 includes a processor 1310, a memory 1320, and a radio frequency (RF) unit 1330.

The RF unit 1330 is connected to the processor 1310, thereby being capable of transmitting and/or receiving radio signals.

The processor 1310 implements the functions, processes, and/or methods proposed in the present invention. For example, the processor 1310 may be implemented to perform the operations of the AP according to the above-described exemplary embodiments of the present invention. The processor may perform the operations of the AP, which are disclosed in the exemplary embodiments of FIG. 1 to FIG. 12.

For example, the processor 1310 may be configured to generate a frame that is to be transmitted to the STA and to transmit the generated frame to the STA. At this point, the frame may correspond to an aggregated (A)-medium access control (MAC) protocol data unit (MPDU), and the A-MPDU may include an A-MPDU header subframe and A-MPDU subframes. The A-MPDU header subframe may include a first MPDU, and the A-MPDU subframe may include a second MPDU. As an MPDU, the first MPDU may include a first MAC header excluding a MAC header, and, as an MPDU, the second MPDU may include a MAC body and a second MAC header.

The A-MPDU header subframe may further include a first error check bit only for the first MAC header, and the A-MPDU subframe may further include a second error check bit only for the second MAC header.

The first MAC header may include a common header field, and the common header field may include MAC header information that is common to each of a plurality of A-MPDU subframes including the A-MPDU subframe included in the A-MPDU.

The second MAC header may include a unique header field, and the unique header field may include unique MAC header information corresponding to the A-MPDU subframe excluding the common header field.

The A-MPDU subframe may include an MPDU delimiter, and the MPDU delimiter may include an error check field and a compressed header field. The error check field may include information indicating whether or not a second error check bit is included in the A-MPDU subframe, and the compressed header field may include information indicating whether or not the second MAC header includes a unique header field. Additionally, the A-MPDU subframe may further include a third error check bit for the MAC body.

The first error check bit may be used by the STA for checking whether or not an error has occurred in the first MAC header, and the second error check bit may be used by the STA for checking whether or not an error has occurred in the second MAC header. The third error check bit may be used by the STA for checking whether or not an error has occurred in the MAC body.

As a MU PPDU, in case the PPDU, which is transmitted by the AP, includes a plurality of frames being transmitted to a plurality of STAS, the above-described error check operation may be performed by each of the plurality of STAs. Each of the plurality of frames being included in the MU PPDU may respectively include each of a plurality A-MPDUs corresponding to each of the plurality of STA.

The STA 1350 includes a processor 1360, a memory 1370, and a radio frequency (RF) unit 1380.

The RF unit 1380 is connected to the processor 1360, thereby being capable of transmitting and/or receiving radio signals.

The processor 1360 implements the functions, processes, and/or methods proposed in the present invention. For example, the processor 1360 may be implemented to perform the operations of the STA according to the above-described exemplary embodiments of the present invention. The processor 1360 may perform the operations of the STA, which are disclosed in the exemplary embodiments of FIG. 1 to FIG. 12.

For example, the processor 1360 may be configured to generate a frame that is to be transmitted to the access point (AP) and to transmit the generated frame to the AP. At this point, the frame may correspond to an aggregated (A)-medium access control (MAC) protocol data unit (MPDU), and the A-MPDU may include an A-MPDU header subframe and A-MPDU subframes. The A-MPDU header subframe may include a first MPDU, and the A-MPDU subframe may include a second MPDU. As an MPDU, the first MPDU may include a first MAC header excluding a MAC header, and, as an MPDU, the second MPDU may include a MAC body and a second MAC header.

The A-MPDU header subframe may further include a first error check bit only for the first MAC header, and the A-MPDU subframe may further include a second error check bit only for the second MAC header.

The first MAC header may include a common header field, and the common header field may include MAC header information that is common to each of a plurality of A-MPDU subframes including the A-MPDU subframe included in the A-MPDU.

The second MAC header may include a unique header field, and the unique header field may include unique MAC header information corresponding to the A-MPDU subframe excluding the common header field.

The A-MPDU subframe may include an MPDU delimiter, and the MPDU delimiter may include an error check field and a compressed header field. The error check field may include information indicating whether or not a second error check bit is included in the A-MPDU subframe, and the compressed header field may include information indicating whether or not the second MAC header includes a unique header field. Additionally, the A-MPDU subframe may further include a third error check bit for the MAC body.

The first error check bit may be used by the AP for checking whether or not an error has occurred in the first MAC header, and the second error check bit may be used by the AP for checking whether or not an error has occurred in the second MAC header. The third error check bit may be used by the AP for checking whether or not an error has occurred in the MAC body.

The processor 1310 and 1360 may include an application-specific integrated circuit (ASIC), another chip set, a logical circuit, a data processing device, and/or a converter converting a baseband signal and a radio signal to and from one another. The memory 1320 and 1370 may include a read-only memory (ROM), a random access memory (RAM), a flash memory, a memory card, a storage medium, and/or another storage device. The RF unit 1330 and 1380 may include one or more antennas transmitting and/or receiving radio signals.

When the exemplary embodiment is implemented as software, the above-described method may be implemented as a module (process, function, and so on) performing the above-described functions. The module may be stored in the memory 1320 and 1370 and may be executed by the processor 1310 and 1360. The memory 1320 and 1370 may be located inside or outside of the processor 1310 and 1360 and may be connected to the processor 1310 and 1360 through a diversity of well-known means.

What is claimed is:

1. A method for transmitting a frame in a wireless local area network (WLAN), the method comprising:
   generating, by a station (STA), a frame that is to be transmitted to an access point (AP),
   wherein the frame corresponds to an aggregated-medium access control (MAC) protocol data unit (A-MPDU),
   wherein the A-MPDU includes an A-MPDU header subframe and a plurality of A-MPDU subframes, and
   wherein the A-MPDU header subframe is located at a position to be decoded prior to the plurality of A-MPDU subframes in the A-MPDU; and
   transmitting, by the STA, the frame to the AP,
   wherein the A-MPDU header subframe includes a first MPDU excluding a first MAC body,
   wherein each of the plurality of A-MPDU subframes includes a second MPDU,
   wherein the first MPDU includes a first MAC header that includes a common header field and first error check bits only for the first MAC header, wherein the second MPDU includes a second MAC header that includes a unique header field, a second MAC body and second error check bits only for the second MAC header, wherein the common field includes common MAC header information commonly applied to each of the plurality of A-MPDU subframes, wherein the unique header field includes unique MAC header information uniquely applied to each of the plurality of A-MPDU subframes, wherein the common MAC header information is excluded in the unique header field, wherein each of the plurality of A-MPDU subframes includes a MPDU delimiter, wherein the MPDU delimiter includes an error check field and a compressed header field, wherein the error check field includes information indicating whether or not the second error check bits are included, and wherein the compressed header field includes information indicating whether or not the second MAC header includes the unique header field.

2. The method of claim 1, wherein each of the plurality of A-MPDU subframes further includes third error check bits for the MAC body, wherein the first error check bits are used by the AP for checking whether or not an error occurs in the first MAC header, wherein the second error check bits are used by the AP for checking whether or not an error occurs in the second MAC header, and wherein the third error check bits are used by the AP for checking whether or not an error occurs in the MAC body.

3. A station (STA) for transmitting a frame in a wireless local area network (WLAN), the STA comprising:

a transceiver configured to transmit or receive radio signals; and a processor operatively connected to the transceiver, wherein the processor is configured to generate a frame that is to be transmitted to an access point (AP), wherein the frame corresponds to an aggregated-medium access control (MAC) protocol data unit (A-MPDU), wherein the A-MPDU includes an A-MPDU header subframe and a plurality of A-MPDU subframes, and wherein the A-MPDU header subframe is located at a position to be decoded prior to the plurality of A-MPDU subframes in the A-MPDU, and control the transceiver to transmit the frame to the AP, wherein the A-MPDU header subframe includes a first MPDU excluding a first MAC body, wherein each of the plurality of A-MPDU subframes includes a second MPDU, wherein the first MPDU includes a first MAC header that includes a common header field and first error check bits only for the first MAC header, wherein the second MPDU includes a second MAC header that includes a unique header field, a second MAC body and second error check bits only for the second MAC header, wherein the common field includes common MAC header information commonly applied to each of the plurality of A-MPDU subframes, wherein the unique header field includes unique MAC header information uniquely applied to each of the plurality of A-MPDU subframes, wherein the common MAC header information is excluded in the unique header field, wherein each of the plurality of A-MPDU subframes includes a MPDU delimiter, wherein the MPDU delimiter includes an error check field and a compressed header field, wherein the error check field includes information indicating whether or not the second error check bits are included, and wherein the compressed header field includes information indicating whether or not the second MAC header includes the unique header field.

4. The STA of claim 3, wherein each of the plurality of A-MPDU subframes further includes third error check bits for the MAC body, wherein the first error check bits are used by the AP for checking whether or not an error occurs in the first MAC header, wherein the second error check bits are used by the AP for checking whether or not an error occurs in the second MAC header, and wherein the third error check bits are used by the AP for checking whether or not an error occurs in the MAC body.

* * * * *